United States Patent [19]

Lindstedt

[11] Patent Number: 5,109,668
[45] Date of Patent: May 5, 1992

[54] MARINE EXHAUST MANIFOLD AND ELBOW

[75] Inventor: Dennis H. Lindstedt, Winneconne, Wis.

[73] Assignee: Brunswick Corporation, Skokie, Ill.

[21] Appl. No.: 665,994

[22] Filed: Mar. 7, 1991

[51] Int. Cl.[5] .............................................. F21N 3/02
[52] U.S. Cl. ........................................ 60/310; 60/317; 60/320; 60/323; 60/324
[58] Field of Search ................. 60/310, 317, 320, 323, 60/324

[56] References Cited

U.S. PATENT DOCUMENTS

| | | | |
|---|---|---|---|
| 3,444,687 | 5/1969 | Anderson | 60/323 |
| 3,541,786 | 11/1970 | Sarra | |
| 3,798,904 | 3/1974 | Gleason et al. | 60/310 |
| 4,214,443 | 7/1980 | Herenius | 60/321 |
| 4,484,440 | 11/1984 | Oki et al. | 60/276 |
| 4,573,318 | 3/1986 | Entringer et al. | 60/310 |
| 4,711,088 | 12/1987 | Berchem et al. | 60/321 |
| 4,815,274 | 3/1989 | Piatti | 60/313 |
| 4,845,945 | 7/1989 | Widmer et al. | 60/310 |
| 4,866,934 | 9/1989 | Lindstedt | 60/321 |
| 4,977,741 | 12/1990 | Lulloff et al. | 60/310 |

FOREIGN PATENT DOCUMENTS

| | | | |
|---|---|---|---|
| 0041723 | 3/1977 | Japan | 60/323 |
| 24105 | 10/1907 | United Kingdom | 60/323 |

Primary Examiner—Ira S. Lazarus
Assistant Examiner—L. Heyman
Attorney, Agent, or Firm—Andrus, Sceales, Starke & Sawall

[57] ABSTRACT

A marine exhaust assembly (10) includes a manifold portion (14), an elbow portion (24), a water jacket portion (38), and exhaust runner walls (40, 42, 44, 70, 72, 74, 76, 78, 80), providing a smooth continuous transition of exhaust gas flow from intake exhaust passages (16, 18, 20, 22) in the manifold portion (14) to transfer exhaust passages (26, 28, 30, 32) in the elbow portion (24) around a bend (34) to a discharge exhaust passage (36), minimizing turbulent flow of exhaust through the manifold portion (14) and elbow portion (24). Each transfer exhaust passage has its own water supply inlet (96, 98, 100, 102) at the upstream end of the respective intake exhaust passage. An upper vent includes a steam outlet opening (120) in the water jacket at the high point of the elbow portion, and a steam exhaust channel (122) extending along the top exterior of the water jacket portion in a raised bead (124) above and parallel to an upper water flow passage (126) and directing steam to the end of the discharge exhaust passage to mix with water and exhaust thereat. Wall supports (150, 152, 154) assist in directing cooling water up through the water jacket to the top of the elbow bend, and also prevent wall collapse during lost foam stainless steel casting.

26 Claims, 2 Drawing Sheets

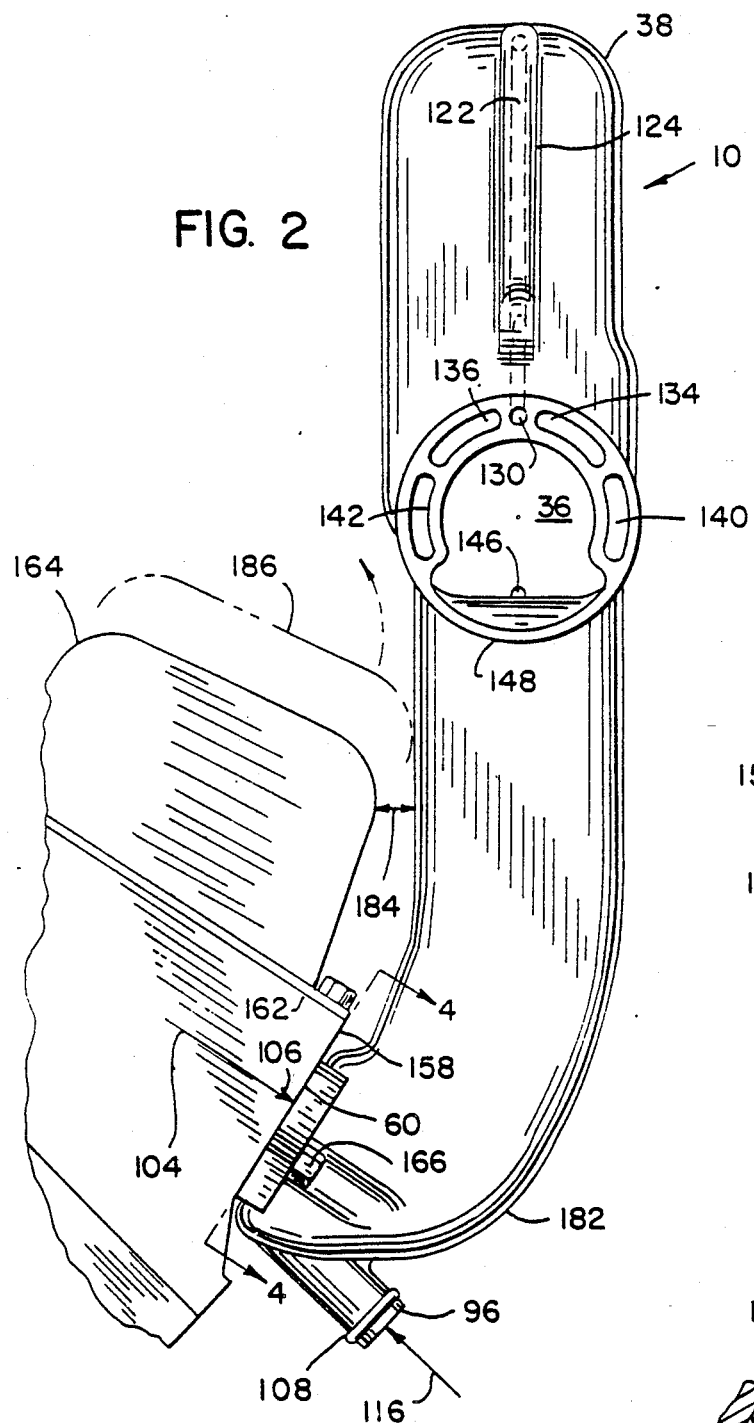
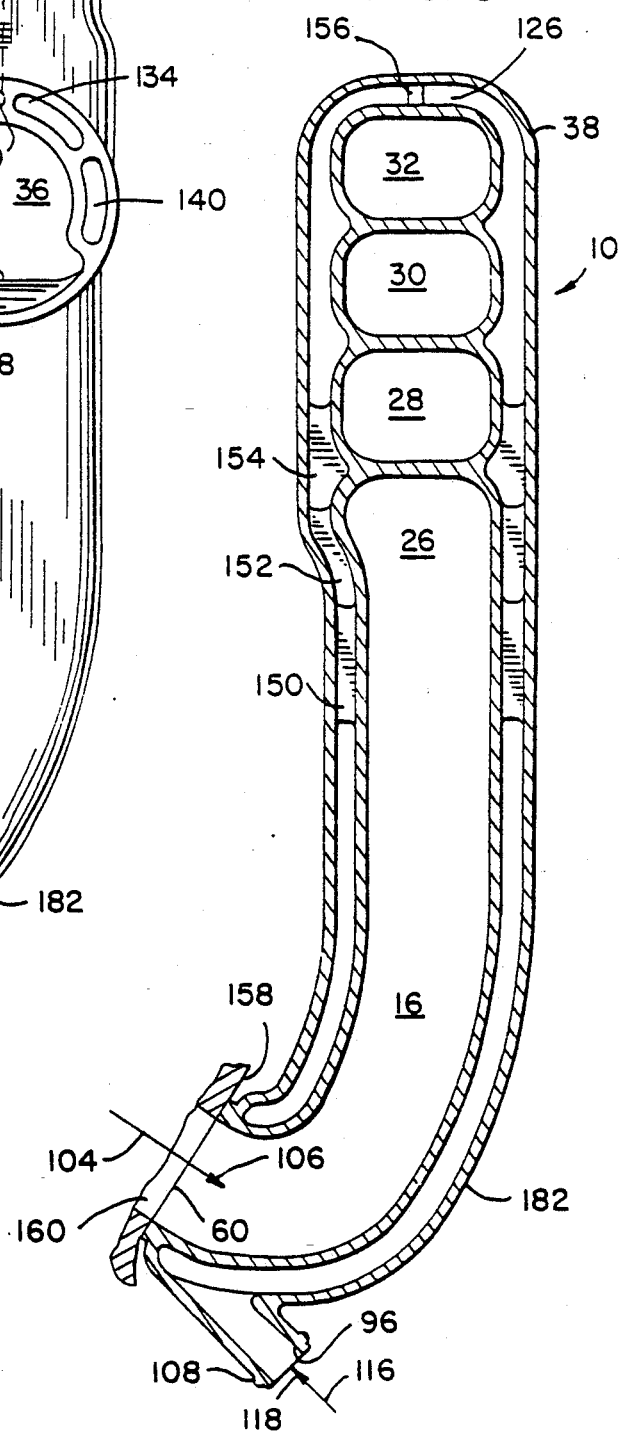

MARINE EXHAUST MANIFOLD AND ELBOW

BACKGROUND AND SUMMARY

The invention relates to marine drive exhaust systems, and more particularly to exhaust manifolds and elbows.

In a marine propulsion system, an internal combustion engine is exhausted through a water jacketed exhaust manifold and a water jacketed exhaust elbow. Engine exhaust is directed through the manifold and into the elbow and around a bend in the elbow to a discharge exhaust passage. The exhaust passages are surrounded by water passages for cooling the engine exhaust. The water mixes with the exhaust at the end of the discharge exhaust passage. Examples of prior exhaust systems are shown in U.S. Pat. Nos. 3,541,786, 4,573,318, 4,711,088, 4,866,934, and 4,977,741, incorporated herein by reference.

In one aspect of the present invention, an exhaust assembly is provided combining the manifold and elbow, and having exhaust divider runner walls extending from the manifold portion into the elbow portion and at least partially around the elbow bend and defining and separating intake exhaust passages in the manifold portion into individual passages merging into individual respective transfer exhaust passages in the elbow portion, and defining and separating the transfer exhaust passages into individual passages merging into a common passage at the discharge exhaust passage downstream of the elbow bend. The exhaust divider structure provides a smooth continuous transition of exhaust gas flow from the intake exhaust passages to the transfer exhaust passages to the discharge exhaust passage, and minimizes turbulent flow of exhaust through the manifold portion and the elbow portion. The exhaust divider runner wall structure has been found to increase horsepower.

In another aspect of the invention, steam build-up in the water jacket is prevented by providing an upper vent at the high point of the elbow bend, and a lower vent below the discharge exhaust passage. The upper vent is provided by a steam outlet opening in the water jacket at the high point of the elbow bend, and a steam exhaust channel formed along the exterior of the water jacket .nd extending from the steam outlet opening to direct steam to the end of the discharge exhaust passage to mix with water and exhaust thereat. The lower vent may also supply cooling water to an unjacketed section of the discharge exhaust passage along the underside thereof to cool same when water is flowing through the water jacket.

In another aspect of the invention, each transfer exhaust passage extending from its respective intake exhaust passage has its own water supply inlet adjacent a respective exhaust inlet opening in the manifold portion and at the upstream end of the respective intake exhaust passage. The water inlet openings are provided by cast fittings each extending along an axis offset from and generally parallel to the axis of engine exhaust flow into the exhaust inlet opening and in the opposite direction thereto.

In another aspect of the invention, a plurality of wall supports are provided between the water jacket and the elbow portion, which wall supports are angled to deflect and direct water flow upwardly to the top of the elbow portion.

In another aspect, the invention enables the manifold portion, elbow portion, and water jacket portion to be integrally lost foam cast from stainless steel as a unitary one piece member, including the noted exhaust divider runner walls, steam exhaust channel, and wall supports. The wall supports prevent collapsing of the water jacket portion and elbow portion toward each other during lost foam casting of the stainless steel material. The cast stainless steel exhaust assembly eliminates problems encountered with prior manifolds and elbows of cast iron or ductile iron, which are subject to rusting, primarily where the manifold is mounted to the engine. The extremely high temperature in such area burns paint away, and the exposure to water creates rust. The present invention enables the exhaust assembly to be formed of stainless steel, which provides improved corrosion resistance. The invention also enables lost foam casting of the exhaust assembly, which eliminates slag from forming and blocking water passages, which can be a problem in prior cast iron and ductile iron assemblies. The invention further enables thin wall construction, and an accompanying reduction in size and weight. The noted wall supports prevent collapse of such thin wall construction. The wall supports include a plurality of staggered spaced parallel segments in louver arrangement providing the noted angle to deflect and direct water flow therebetween upwardly to the top of the elbow portion and around the bend.

In another aspect, the invention enables the exhaust assembly to extend outwardly from a first engine surface having exhaust ports and curving and extending past a valve cover on a second adjacent engine surface, and spaced from the valve cover a sufficient distance to enable clearance and removal of the valve cover past the exhaust assembly without requiring disassembly or removal of the exhaust assembly.

In another aspect of the invention, the exhaust discharge passage extends downwardly at a 13° angle relative to horizontal, to match the standard boat transom angle. This in turn enables the exhaust from the discharge end of the elbow portion to flow straight through the transom at a 90° angle relative thereto, without further bends or deflections in the coupling hose or pipe structure between the end of the elbow portion and the transom.

DESCRIPTION OF THE DRAWINGS

FIG. 2 is an end view from the rear of the structure of FIG. 1.

FIG. 3 is a sectional view taken along line 3—3 of FIG. 1.

DETAILED DESCRIPTION

Figure 1:
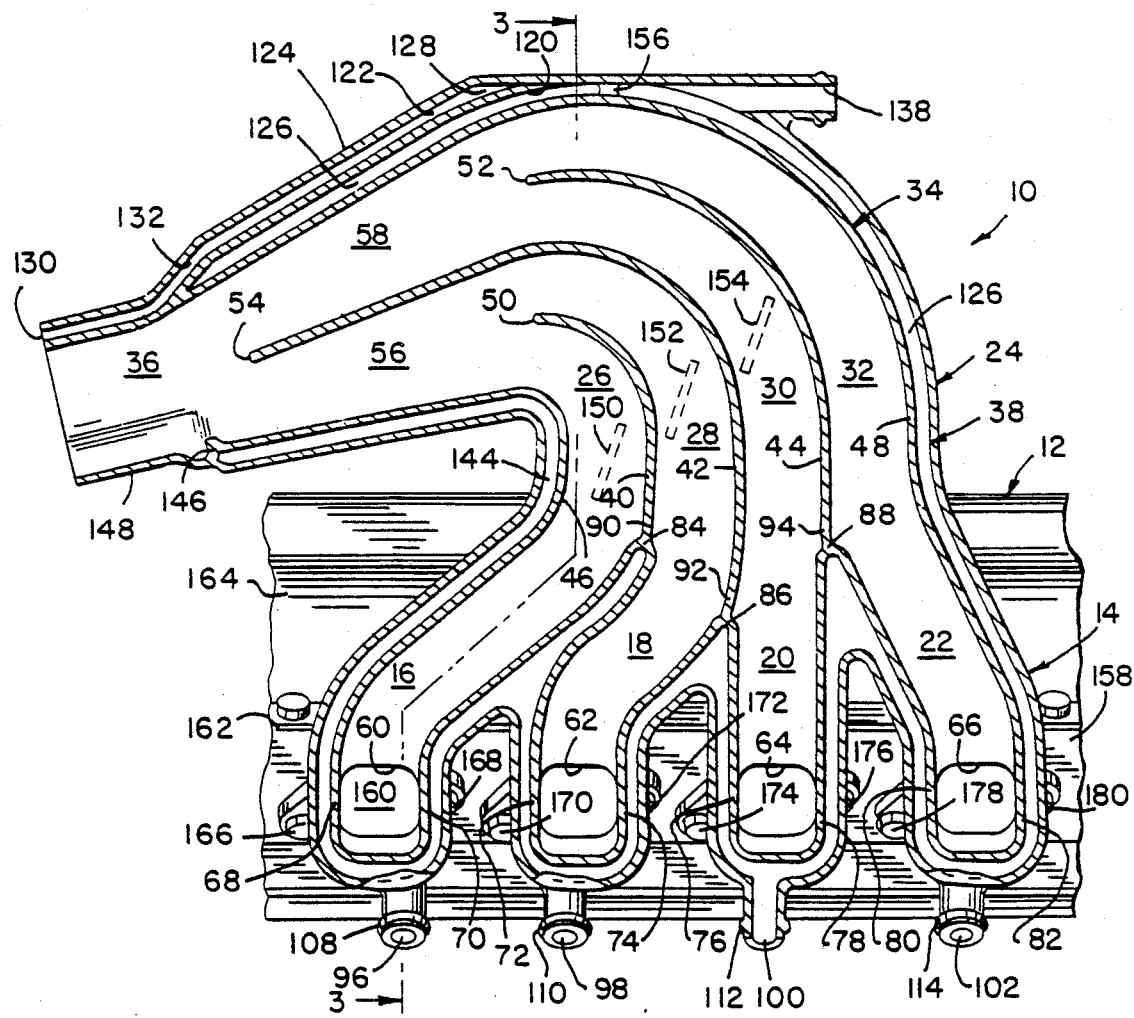
FIG. 1 is a side view, partly in section, of an exhaust assembly constructed in accordance with the invention.
Figure 4:
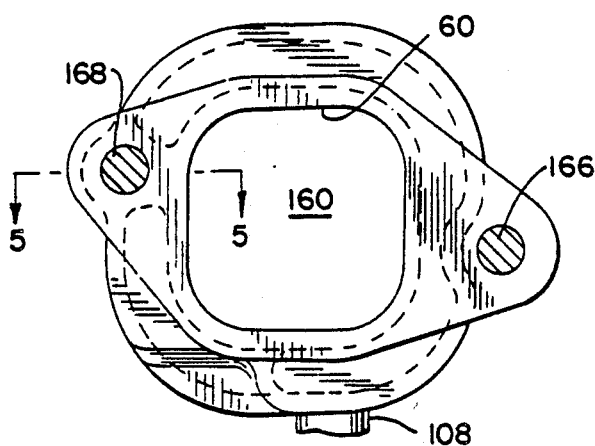
FIG. 4 is a view taken along line 4—4 of FIG. 2.
Figure 5:
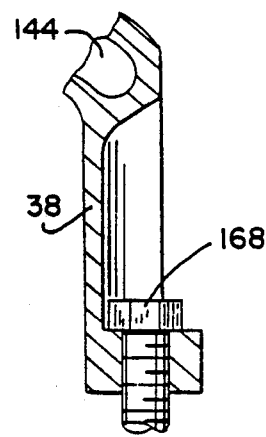
FIG. 5 is a view taken along line 5—5 of FIG. 4.

FIG. 1 shows an exhaust assembly 10 for a marine propulsion system having an internal combustion engine 12 exhausted through a water jacketed exhaust manifold and a water jacketed exhaust elbow. The exhaust assembly combines the manifold and elbow. The exhaust assembly includes a manifold portion 14 having intake exhaust passages 16, 18, 20, 22 receiving engine exhaust. The assembly includes an elbow portion 24 extending from manifold portion 14 and having transfer exhaust passages 26, 28, 30, 32 extending from respective intake exhaust passages 16, 18, 20, 22 and communicating through a bend 34 with a discharge exhaust passage 36. The assembly includes a water jacket portion 38 around exhaust passages 16, 18, 20, 22, 26, 28, 30, 32 and directing water along the exterior of the exhaust passages to the end of discharge exhaust passage 36 to mix with exhaust thereat. The mixed exhaust and water are then discharged through the boat transom, for example as shown in incorporated U.S Pat. No. 4,573,318 through exhaust bellows tube 12 through transom 14, or through lower gearcase 16 of the '318 patent, or through an exhaust pipe such as shown at 14 in incorporated U.S. Pat. No. 4,866,934.

Exhaust divider structure is provided by runner walls 40, 42, 44 extending from manifold portion 14 into elbow portion 24 and at least partially around bend 34. Runner walls 40, 42, 44 are curved in elbow portion 24 and extend generally parallel to each other. Runner walls 40, 42, 44 together with elbow walls 46, 48 define the noted transfer exhaust passages 26, 28, 30, 32 in elbow portion 24. Runner walls 40 and 44 have downstream ends 50 and 52, respectively. Runner wall 42 is disposed between runner walls 40 and 44 and extends further downstream beyond downstream ends 50 and 52 of runner walls 40 and 44 to a downstream end 54 of runner wall 42. Transfer exhaust passages 26 and 28 merge into a subcommon passage 56 at downstream end 50 of runner wall 40, which subcommon passage 56 extends along runner wall 42 to the downstream end 54 of runner wall 42. Transfer exhaust passages 30 and 32 merge into a subcommon passage 58 at downstream end 52 of runner wall 44, which subcommon passage 58 extends along runner wall 42 to downstream end 54 of runner wall 42 and on the opposite side thereof from subcommon passage 58. Subcommon passages 56 and 58 merge into common discharge exhaust passage 36 at downstream end 54 of runner wall 42. Downstream ends 50 and 52 of runner walls 40 and 44 are spaced approximately the same distance from the end of discharge exhaust passage 36.

Manifold portion 14 has a plurality of exhaust inlet openings 60, 62, 64, 66. The assembly includes a manifold wall 68 and a runner wall 70 around exhaust inlet opening 60 and extending therefrom and defining intake exhaust passage 16 between manifold wall 68 and runner wall 70. The assembly includes runner walls 72 and 74 around exhaust inlet opening 62 and extending therefrom and defining intake exhaust passage 18 between runner walls 72 and 74. The assembly includes runner walls 76 and 78 around exhaust inlet opening 64 and extending therefrom and defining intake exhaust passage 20 between runner walls 76 and 78. The assembly includes runner wall 80 and manifold wall 82 around exhaust inlet opening 66 and extending therefrom and defining intake exhaust passage 22 between runner wall 80 and manifold wall 82. Runner walls 70 and 72 merge at merge point 84 upstream from exhaust inlet openings 60 and 62. Runner walls 74 and 76 merge at merge point 86 upstream from exhaust inlet openings 62 and 64. Runner walls 78 and 80 merge at merge point 88 upstream from exhaust inlet openings 64 and 66. Runner wall 40 has an upstream end 90 merging with runner walls 70 and 72 at merge point 84. Runner wall 42 has an upstream end 92 merging with runner walls 74 and 76 at merge point 86. Runner wall 44 has an upstream end 94 merging with runner walls 78 and 80 at merge point 88.

The exhaust divider structure provided by the noted runner walls extends from manifold portion 14 into elbow portion 24 and defines and separates intake exhaust passages 16, 18, 20, 22 into individual passages merging into individual respective transfer exhaust passages 26, 28, 30, 32, and defining and separating transfer exhaust passages 26, 28, 30, 32 into individual passages merging into a common passage at discharge exhaust passage 36. The exhaust divider structure provides a smooth continuous transition of exhaust gas flow from intake exhaust passages 16, 18, 20, 22 to transfer exhaust passages 26, 28, 30, 32 to discharge exhaust passage 36, and minimizes turbulent flow of exhaust through manifold portion 14 and elbow portion 24. This has been found to provide increased horsepower.

The noted runner walls define a separate individual intake exhaust passage 16, 18, 20, 22 for each exhaust inlet opening 60, 62, 64, 66, respectively, and communicate exhaust from each exhaust inlet opening 60, 62, 64, 66 to a respective separate individual transfer exhaust passage 26, 28, 30, 32 in elbow portion 24, such that each exhaust inlet opening 60, 62, 64, 66 in manifold portion 14 has a dedicated transfer exhaust passage 26, 28, 30, 32, respectively, in elbow portion 24.

Water jacket 38 has a plurality of water inlet openings 96, 98, 100, 102, one for each exhaust inlet opening 60, 62, 64, 66, respectively, such that each transfer exhaust passage 26, 28, 30, 32 in elbow portion 24 has its own dedicated water supply inlet opening 96, 98, 100, 102, respectively. Each water inlet opening 96, 98, 100, 102 in water jacket 38 is adjacent its respective exhaust inlet opening 60, 62, 64, 66 in manifold portion 14 and at the upstream end of the respective intake exhaust passage 16, 18, 20, 22. Engine exhaust enters its respective exhaust inlet opening 60, 62, 64, 66 along a respective first axis, such as 104, FIGS. 2 and 3, and in the direction shown at arrow 106. Each water inlet opening 96, 98, 100, 102 is formed by a cast nipple or fitting 108, 110, 112, 114, respectively, formed integrally with water jacket 38 and extending therefrom along a second respective axis, such as 116, FIGS. 2 and 3, offset from and generally parallel to axis 104. Water flow into water inlet opening 96 flows along axis 116 in the direction shown at arrow 118. Water flow into water inlet opening 96 along axis 116 in direction 118 is generally parallel to and offset from and in the opposite direction to engine exhaust flow along axis 104 in direction 106 into the respective exhaust inlet opening 60.

Engine exhaust flows upwardly from manifold portion 14 into elbow portion 24 and around bend 34 to discharge exhaust passage 36. Water jacket 38 around the exhaust passages directs water along the exterior of the exhaust passages upwardly along manifold portion 14 to elbow portion 24 and then upwardly and around bend 34 and then to the end of discharge exhaust passage 36 to mix with exhaust thereat. An upper vent is provided in water jacket 38 at the high point of bend 34 and vents steam from water jacket 38 to prevent steam buildup therein. The upper vent includes a steam outlet opening 120 in water jacket 38 at the high point of bend 34. The upper vent further includes a steam exhaust channel 122 formed along the top of water jacket 38 and extending from steam outlet opening 120 to direct steam to the end of discharge exhaust passage 36 to mix with water and exhaust thereat. Steam exhaust channel 122 is formed within a raised bead 124, FIGS. 2 and 3, extending along the top exterior of water jacket 38.

Water jacket 38 includes an upper water flow passage 126 extending along the top of elbow portion 24 between bend 34 and the end of discharge exhaust passage 36. Steam exhaust channel 122 extends along the top of water jacket 38 above upper water flow passage 126. Discharge exhaust passage 36 and upper water flow passage 126 and steam exhaust channel 122 extend generally parallel to each other. Steam exhaust channel 122 is an enclosed cast channel integrally formed with water jacket 38 in raised bead 124 and has an entrance 128 at steam outlet opening 120, and an exit 130 at the end of discharge exhaust passage 36. Steam exhaust channel 122 extends from entrance 128 along and above upper water flow passage 126, and then extends downwardly at 132 to exit opening 130 at generally the same horizontal level as upper water flow passage 126 at exit openings 134, 136, FIG. 2. Water jacket 38 includes a cold water fill inlet 138, FIG. 1, comparable to inlet 130 in incorporated U.S. Pat. No. 4,573,318, and inlets 233 and 34 in incorporated U.S. Pat. No. 4,977,741.

As above noted, water jacket 38 defines an upper water flow passage 126 extending upwardly along manifold portion 14 to elbow portion 24 and then along the top of bend 34 and then to discharge exhaust passage 36, FIG. 1, through outlets 134, 136, 140, 142, FIG. 2. The water jacket also defines a lower water flow passage 144 extending upwardly along manifold portion 14 to elbow portion 24 and then along the bottom of bend 34 and then to discharge exhaust passage 36. A lower vent vents steam from lower water flow passage 144 and is provided by a lower steam outlet opening 146 in water jacket 38 below discharge exhaust passage 36. Lower steam outlet opening 146 communicates between lower water flow passage 144 and discharge exhaust passage 36.

Discharge exhaust passage 36 of elbow portion 24 includes a lower unjacketed section 148, FIGS. 1 and 2, which is not covered by water jacket 38. Unjacketed section 148 extends from the end of discharge exhaust passage 36 upstream a given distance along the underside of discharge exhaust passage 36. Lower vent steam outlet opening 146 is formed in water jacket 38 at the upstream end of unjacketed section 148. In addition to venting steam, opening 146 also discharges water from water jacket 38 along unjacketed section 148 to cool same when water is flowing through water jacket 38.

Exhaust assembly 10 is a one piece integrally lost foam cast stainless steel assembly. Manifold portion 14, elbow portion 24, water jacket portion 38, exhaust divider runner walls 40, 42, 44, 70, 72, 74, 76, 78, 80, steam exhaust channel bead 124, and water inlet opening fittings 108, 110, 112, 114 are all integrally lost foam cast as a one piece unitary assembly. The noted runner walls are integrally cast with manifold portion 14 and elbow portion 24 and integrally extend from manifold portion 14 into elbow portion 24.

A plurality of wall supports 150, 152, 154, FIGS. 1 and 3, extend between water jacket 38 and elbow portion 24, and are angled to deflect and direct water flow upwardly to the top of elbow portion 24. Wall supports 150, 152, 154 are provided by a plurality of staggered spaced parallel segments in louver arrangement deflecting and directing water flow upwardly therebetween to the top of elbow portion 24. Manifold portion 14, elbow portion 24, water jacket 24, and wall supports 150, 152, 154 are integrally lost foam cast as a one piece unitary assembly. Wall supports 150, 152, 154 are integrally cast with elbow portion 24 and water jacket 38 and extend integrally therebetween. Wall supports 150, 152, 154 prevent collapsing of water jacket 38 and elbow portion 24 toward each other during lost foam casting. Wall supports 150, 152, 154 provide the dual functions of preventing the noted collapse during lost foam casting, and also deflecting and directing water flow upwardly therebetween to the top of elbow portion 24. An integrally cast wall support 156, FIGS. 1 and 3, is also provided at the top of the elbow bend.

Engine 12 has a first surface 158, FIGS. 2 and 3, with exhaust ports such as 160 therethrough. The engine has a second surface 162, FIG. 2, adjacent first surface 158 and having a valve cover 164 extending outwardly therefrom. Bolts 166, 168, 170, 172, 174, 176, 178, 180, FIG. 1, mount exhaust assembly 10 to surface 158 over the exhaust ports such that the intake exhaust passages communicate with the exhaust ports. Exhaust assembly 10 extends outwardly from surface 158, FIGS. 2 and 3, and curves at 182 and extends past valve cover 164 and is spaced from valve cover 164 by gap 184, FIG. 2, a sufficient distance to enable clearance and removal of valve cover 164, as shown at dashed line 186, FIG. 2, pas exhaust assembly 10 without requiring disassembly or removal of exhaust assembly 10. Exhaust assembly 10 further curves downwardly at bend 34 such that discharge exhaust passage 36 extends downwardly from bend 34 at a 13° angle relative to horizontal, matching the standard boat transom angle. This enables the exhaust from the end of discharge exhaust passage 36 to flow straight through the transom at a 90° angle relative thereto, without further bends or deflections in the coupling structure between the end of the elbow portion and the transom. The coupling structure may be an exhaust bellows hose or tube such as shown at 12 in incorporated U.S. Pat. No. 4,573,318, or an exhaust pipe such as shown at 14 in incorporated U.S. Pat. No. 4,866,934.

It is recognized that various equivalents, alternatives and modifications are possible within the scope of the appended claims.

I claim:

1. In a marine propulsion system having an internal combustion engine exhausted through a water jacketed exhaust manifold and a water jacketed exhaust elbow, an exhaust assembly combining said manifold and elbow, said exhaust assembly comprising:

a manifold portion having a plurality of intake exhaust passages receiving engine exhaust;

an elbow portion extending from said manifold portion and having a plurality of transfer exhaust passages extending from said intake exhaust passages and communicating through a bend with a discharge exhaust passage;

water jacket means around said intake exhaust passages and said transfer exhaust passages and directing water along the exterior of said intake exhaust passages and said transfer exhaust passages to the end of said discharge exhaust passage to mix with exhaust thereat;

exhaust divider means extending from said manifold portion into said elbow portion and defining and separating said intake exhaust passages into individual passages extending into individual respective said transfer exhaust passages, and defining and separating said transfer exhaust passages into individual passages merging into a common passage at said discharge exhaust passage, said exhaust divider means providing a smooth continuous transition of exhaust gas flow from said intake exhaust passages to said transfer exhaust passages to said discharge exhaust passage and minimizing turbulent flow of exhaust through said manifold portion and said elbow portion, wherein said exhaust divider means comprises runner walls extending from said manifold portion into said elbow portion and at least partially around said bend, and said manifold portion has a plurality of exhaust inlet openings, and said runner walls define a separate individual intake exhaust passage for each said exhaust inlet openings and communicating exhaust from each said exhaust inlet opening to a respective separate individual transfer exhaust passage in said elbow portion, such that each said exhaust inlet opening has a dedicated intake exhaust passage in said manifold portion and dedicated transfer exhaust passage in said elbow portion.

2. The invention according to claim 1 comprising:

a first manifold wall and a first runner wall around a first exhaust inlet opening and extending therefrom and defining a first intake exhaust passage between said first manifold wall and said first runner wall;

second and third runner walls around a second exhaust inlet opening and extending therefrom and defining a second intake exhaust passage between said second and third runner walls;

fourth and fifth runner walls around a third exhaust inlet opening and extending therefrom and defining a third intake exhaust passage between said fourth and fifth runner walls;

a sixth runner wall and a second manifold wall around a fourth exhaust inlet opening and extending therefrom and defining a fourth intake exhaust passage between said sixth runner wall and said second manifold wall;

said first and second runner walls merging at a first merge point upstream from said first and second exhaust inlet openings;

said third and fourth runner walls merging at a second merge point upstream from said second and third exhaust inlet openings;

said fifth and sixth runner walls merging at a third merge point upstream from said third and fourth exhaust inlet openings;

a seventh runner wall in said elbow portion and having an upstream end merging with said first and second runner walls at said first merge point;

an eighth runner wall in said elbow portion and having an upstream end merging with said third and fourth runner walls at said second merge point;

a ninth runner wall in said elbow portion and having an upstream end merging with said fifth and sixth runner walls at said third merge point.

3. The invention according to claim 1 wherein said water jacket means has a plurality of water inlet openings, one for each said exhaust inlet opening such that each said transfer exhaust passage has its own dedicated water supply inlet.

4. The invention according to claim 3 wherein in each said water inlet opening in said water jacket means is adjacent its respective said exhaust inlet opening in said manifold portion and at the upstream end of the respective said intake exhaust passage.

5. The invention according to claim 4 wherein engine exhaust enters its respective exhaust inlet opening along a respective first axis, and each said water inlet opening comprises a cast fitting formed integrally with said water jacket means and extending therefrom along a second respective axis offset from and generally parallel to said first axis and such that water flow into the respective water inlet opening is generally parallel to and offset from and in the opposite direction to exhaust flow into the respective said exhaust inlet opening.

6. The invention according to claim 5 wherein said manifold portion, said elbow portion, said water jacket means, and said exhaust divider means are integrally cast as a one piece unitary assembly, and wherein said runner walls are integrally cast with said manifold portion and said elbow portion and integrally extend from said manifold portion into said elbow portion.

7. In a marine propulsion system having an internal combustion engine exhausted through a water jacketed exhaust assembly, an improved exhaust assembly comprising:

a manifold portion having a plurality of intake exhaust passages receiving engine exhaust;

an elbow portion extending upwardly from said manifold portion and having a plurality of transfer exhaust passages extending from said intake exhaust passages and communicating through a bend with a discharge exhaust passage, wherein exhaust flows upwardly from said manifold portion into said elbow portion and around said bend to said discharge exhaust passage;

water jacket means around said intake exhaust passages and said transfer exhaust passages and directing water along the exterior of said intake exhaust passages and said transfer exhaust passages, wherein water flows upwardly along said manifold portion to said elbow portion and then upwardly and around said bend and then to the end of said discharge exhaust passage to mix with exhaust thereat, said water jacket means defining an upper water flow passage extending upwardly along said manifold portion to said elbow portion and then along the top of said bend and then to said discharge exhaust passage, and a lower water flow passage extending upwardly along said manifold portion to said elbow portion and then along the bottom of said bend and then to said discharge exhaust passage;

lower vent means in said water jacket means venting steam from said lower water flow passage.

8. The invention according to claim 7 wherein said lower vent means comprises a steam outlet opening in said water jacket means below and communicating with said discharge exhaust passage.

9. The invention according to claim 8 wherein said discharge exhaust passage of said elbow portion includes a lower unjacketed section which is not covered by said water jacket means, said unjacketed section extending from the downstream end of said discharge exhaust passage upstream a given distance along the underside of said discharge exhaust passage, and wherein said steam outlet opening is formed in said water jacket means at the upstream end of said unjacketed section, such that, in addition to venting steam from said lower water flow passage to said discharge exhaust passage, said steam outlet opening also discharges water from said water jacket means along said unjacketed section to cool same when water is flowing through said water jacket means.

10. In a marine propulsion system having an internal combustion engine exhausted through a water jacketed exhaust assembly, an improved exhaust assembly comprising:

a manifold portion having a plurality of intake exhaust passages receiving engine exhaust;
an elbow portion extending upwardly from said manifold portion and having a plurality of transfer exhaust passages extending from said intake exhaust passages and communicating through a bend with a discharge exhaust passage, wherein exhaust flows upwardly from said manifold portion into said elbow portion and then upwardly and around said bend to said discharge exhaust passage;
water jacket means around said intake exhaust passages and said transfer exhaust passages and directing water along the exterior of said intake exhaust passages and said transfer exhaust passages, wherein water flows upwardly along said manifold portion to said elbow portion and then upwardly and around said bend and then to the end of said discharge exhaust passage to mix with exhaust thereat, said water jacket means defining an upper water flow passage extending upwardly along said manifold portion to said elbow portion and then along the top of said bend and then to said discharge exhaust passage, and a lower water flow passage extending upwardly along said manifold portion to said elbow portion and then along the bottom of said bend and then to said discharge exhaust passage;
vent means in said water jacket means venting steam from said water jacket means, comprising in combination:
an upper vent venting steam from said upper water flow passage; and
a lower vent venting steam from said lower water flow passage.

11. The invention according to claim 10 wherein:
said upper vent comprises an upper steam outlet opening in said water jacket means at the high point of said bend;
said lower vent comprises a lower steam outlet opening in said water jacket means below said discharge exhaust passage.

12. The invention according to claim 1 wherein said upper vent further comprises a steam exhaust channel formed along said water jacket means and extending from said upper steam outlet opening to direct steam to the end of said discharge exhaust passage to mix with water and exhaust thereat, and wherein said lower steam outlet opening of said lower vent communicates between said lower water flow passage and said discharge exhaust passage.

13. In a marine propulsion system having an internal combustion engine exhausted through a water jacketed exhaust assembly, an improved exhaust assembly comprising:
a manifold portion having a plurality of intake exhaust passages receiving engine exhaust;
an elbow portion extending upwardly from said manifold portion and having a plurality of transfer exhaust passages extending from said intake exhaust passages and communicating through a bend with a discharge exhaust passage, wherein exhaust flows upwardly from said manifold portion into said elbow portion and around said bend to said discharge exhaust passage;
water jacket means around said intake exhaust passages and said transfer exhaust passages and directing water along the exterior of said intake exhaust passages and said transfer exhaust passages, wherein water flows upwardly along said manifold portion to said elbow portion and then upwardly and around said bend and then to the end of said discharge exhaust passage to mix with exhaust thereat;
a plurality of wall supports between said water jacket means and said elbow portion, said wall supports being angled to deflect and direct water flow upwardly to the top of said elbow portion.

14. The invention according to claim 13 wherein said wall supports comprise a plurality of staggered spaced parallel segments in louver arrangement deflecting and directing water flow upwardly therebetween to the top of said elbow portion.

15. The invention according to claim 13 wherein said manifold portion, said elbow portion, said water jacket means, and said wall supports are integrally lost foam cast as a one piece unitary assembly, and wherein said wall supports are integrally cast with said elbow portion and said water jacket means and extend integrally therebetween, and wherein said wall supports prevent collapsing of said water jacket means and said elbow portion toward each other during lost foam casting.

16. The invention according to claim 15 wherein said wall supports comprise a plurality of staggered spaced parallel segments in louver arrangement providing the dual functions of preventing collapse during lost from casting, and also deflecting and directing water flow upwardly therebetween to the top of said elbow portion.

17. In a marine propulsion system having an internal combustion engine exhausted through a water jacketed exhaust manifold and a water jacketed exhaust elbow, an exhaust assembly combining said manifold and elbow, said exhaust assembly comprising:
a manifold portion having a plurality of intake exhaust passages receiving engine exhaust;
an elbow portion extending from said manifold portion and having a plurality of transfer exhaust passages extending from said intake exhaust passages and communicating through a bend with a discharge exhaust passage;
water jacket means around said intake exhaust passages and said transfer exhaust passages and directing water along the exterior of said intake exhaust passages and said transfer exhaust passages to the end of said discharge exhaust passage to mix with exhaust thereat;
exhaust divider means extending from said manifold portion into said elbow portion and defining and separating said intake exhaust passages into individual passages extending into individual respective said transfer exhaust passages, and defining and separating said transfer exhaust passages into individual passages merging into a common passage at said discharge exhaust passage, said exhaust divider means providing a smooth continuous transition of exhaust gas flow from said intake exhaust passages to said transfer exhaust passages to said discharge exhaust passage and minimizing turbulent flow of exhaust through said manifold portion and said elbow portion;
vent means in said water jacket means at the high point of said bend and venting steam from said water jacket means to prevent steam buildup therein;
a plurality of wall supports between said water jacket means and said elbow portion, said wall supports being angled to deflect and direct water flow upwardly to the top of said elbow portion.

18. The invention according to claim 17 wherein:
said exhaust divider means comprises runner walls extending from said manifold portion into said elbow portion and at least partially around into said bend;
said vent means comprises a steam outlet opening in said water jacket means at the high point of said bend, and a steam exhaust channel formed along said water jacket means and extending from said steam outlet opening to direct steam to the end of said discharge exhaust passage to mix with water and exhaust thereat;
said wall supports comprise a plurality of staggered spaced parallel segments in louver arrangement;
said manifold portion, said elbow portion, said water jacket means, said runner walls, said steam exhaust channel, and said wall supports are all integrally lost foam cast as a one piece unitary assembly, with said runner walls integrally cast with said manifold portion and said elbow portion and integrally extending from said manifold portion into said elbow portion, and with said wall supports integrally cast with said water jacket means and said elbow portion and integrally extending therebetween, said wall supports preventing collapsing of said water jacket means and said elbow portion toward each other during lost foam casting.

19. The invention according to claim 18 wherein said manifold portion has a plurality of exhaust inlet openings, said water jacket means has a plurality of water inlet openings at the upstream ends of said intake exhaust passages, wherein engine exhaust enters a respective said exhaust inlet opening along a first axis, each said water inlet opening comprises a fitting extending from said water jacket means along a second respective axis offset from and generally parallel to said first axis and such that water flow into the respective water inlet opening is generally parallel to and offset from and in the opposite direction to exhaust flow into the respective said exhaust inlet opening, and wherein said engine has a first surface with exhaust ports therethrough, and a second surface adjacent said first surface and having a valve cover extending outwardly therefrom, said assembly is mounted to said first surface over said exhaust ports such that said intake exhaust passages in said manifold portion communicate with said exhaust ports, and water flow into said water inlet openings flows toward said first surface.

20. The invention according to claim 19 wherein said exhaust assembly extends outwardly from said first surface and is curved and extends past said valve cover and is spaced from said valve cover a sufficient distance to enable clearance and removal of said valve cover past said exhaust assembly without requiring disassembly or removal of said exhaust assembly, and wherein said exhaust assembly is further curved at said bend such that said discharge exhaust passage extends downwardly from said bend at a 13° angle relative to horizontal.

21. In a marine propulsion system having an internal combustion engine exhausted through a water jacketed exhaust assembly, an improved exhaust assembly comprising:
a manifold portion having a plurality of intake exhaust passages receiving engine exhaust;
an elbow portion extending upwardly from said manifold portion and having a plurality of transfer exhaust passages extending from said intake exhaust passages and communicating through a bend with a discharge exhaust passage, wherein exhaust flows upwardly from said manifold portion into said elbow portion and around said bend to said discharge exhaust passage;
water jacket means around said intake exhaust passages and said transfer exhaust passages and directing water along the exterior of said intake exhaust passages and said transfer exhaust passages, wherein water flows upwardly along said manifold portion to said elbow portion and then upwardly and around said bend and then to the end of said discharge exhaust passage to mix with exhaust thereat;
vent means in said water jacket means at the high point of said bend and venting steam from said water jacket means to prevent steam buildup therein.

22. The invention according to claim 21 wherein said vent means comprises a steam outlet opening in said water jacket means at the high point of said bend, and a steam exhaust channel formed along said water jacket means and extending from said steam outlet opening to direct steam to the end of said discharge exhaust passage to mix with water and exhaust thereat.

23. The invention according to claim 22 wherein said steam exhaust channel is formed in a raised bead extending along the top exterior of said water jacket means.

24. The invention according to claim 22 wherein said water jacket means includes an upper water flow passage extending along the top of said elbow portion between said bend and the end of said discharge exhaust passage, and wherein said steam exhaust channel extends along the top of said water jacket means above said upper water flow passage, and wherein said discharge exhaust passage and said upper water flow passage and said steam exhaust channel extend generally parallel to each other.

25. The invention according to claim 24 wherein said steam exhaust channel is an enclosed cast channel integrally formed with said water jacket means and having an entrance at said stream outlet opening and having an exit at the end of said discharge exhaust passage.

26. The invention according to claim 25 wherein said stream exhaust channel extends from said entrance along and above said upper water flow passage and then extends downwardly to an exit opening at generally the same horizontal level as said upper water flow passage.

* * * * *

UNITED STATES PATENT AND TRADEMARK OFFICE
CERTIFICATE OF CORRECTION

PATENT NO. : 5,109,668
DATED : May 5, 1992
INVENTOR(S) : DENNIS H. LINDSTEDT

It is certified that error appears in the above-identified patent and that said Letters Patent is hereby corrected as shown below:

Claim 1, Col. 7, Line 10, delete "openings" and substitute therefor -- opening --; Claim 6, Col. 8, Line 5, delete "5" and substitute therefor -- 1 --; Claim 12, Col. 9, Line 42, delete "1" and substitute therefor -- 11 --; Claim 16, Col. 10, Line 27, delete "from" and substitute therefor -- foam --; Claim 18, Col. 11, Line 6, after "around" delete "into"; Claim 19, Col. 11, Line 39, after "said" delete "10"; Claim 25, Col. 12, Line 53, delete "stream" and substitute therefor -- steam --; Claim 26, Col. 12, Line 56, delete "stream" and substitute therefor -- steam --;

Signed and Sealed this

Thirteenth Day of July, 1993

Attest:

MICHAEL K. KIRK

*Attesting Officer*   Acting Commissioner of Patents and Trademarks